United States Patent [19]

Karg et al.

[11] 4,213,888

[45] Jul. 22, 1980

[54] PARTICULATE ELASTOMERIC MATERIALS AND METHOD

[75] Inventors: Rudolph F. Karg; Harold J. Gros, both of Baton Rouge, La.

[73] Assignee: Copolymer Rubber & Chemical Corporation, Baton Rouge, La.

[21] Appl. No.: 924,825

[22] Filed: Jul. 14, 1978

Related U.S. Application Data

[63] Continuation of Ser. No. 747,923, Dec. 6, 1976, abandoned.

[51] Int. Cl.$^2$ ................................................. C08F 6/22
[52] U.S. Cl. ........................ 260/33.6 AQ; 260/23.7 A; 260/42.55; 528/483
[58] Field of Search ...................... 528/483; 260/42.55, 260/33.6 AQ, 23.7 A

[56] References Cited

U.S. PATENT DOCUMENTS

| | | | |
|---|---|---|---|
| 3,525,162 | 8/1970 | Brewer et al. | 34/10 |
| 3,907,734 | 9/1975 | Ten Broeck et al. | 260/23.7 M |
| 3,926,877 | 12/1975 | Fogg et al. | 260/23.7 A |

*Primary Examiner*—Stanford M. Levin
*Attorney, Agent, or Firm*—McDougall, Hersh & Scott

[57] ABSTRACT

The preparation of elastomeric materials in the form of free flowing particles in which the latex formed by the polymerization of the monomers in aqueous medium is coagulated to produce particles of a size within the range of 0.5 to 5 millimeters and in which the particles are ultimatedly dried and then cooled while in a fluidized state and which includes the addition of partitioning agents to obstruct agglomeration.

21 Claims, 1 Drawing Figure

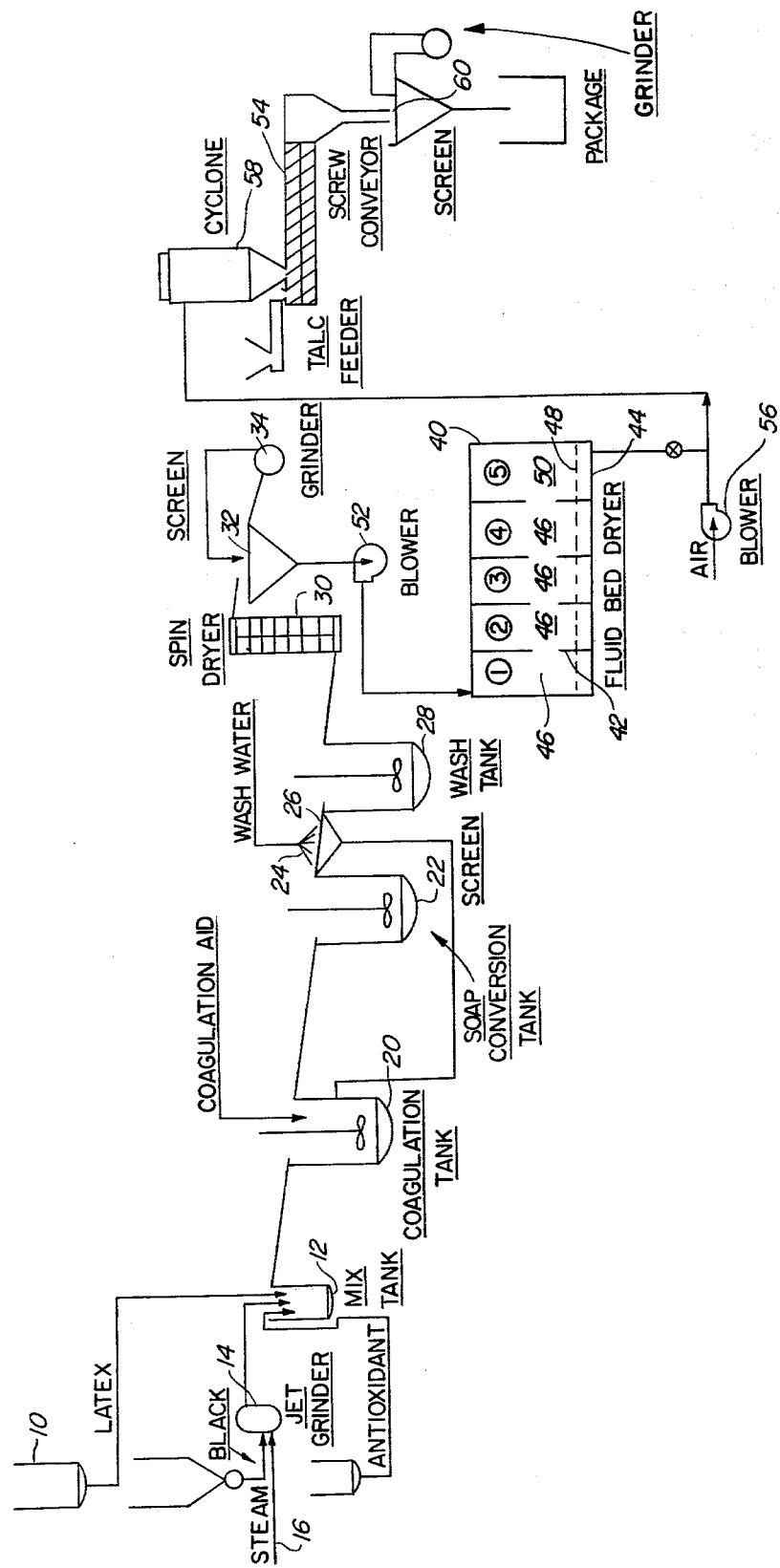

PARTICULATE ELASTOMERIC MATERIALS AND METHOD

This is a continuation of application Ser. No. 747,923, filed Dec. 6, 1976, now abandoned.

This invention relates to the preparation of synthetic elastomers and more particularly to the preparation of synthetic elastomers in a free-flowing particulate form suitable for use in further processing in the manufacture of elastomeric products and relates further to the preparation of such particulate elastomeric materials in which additional components, such as carbon black, fillers, extender oils, antioxidants, and other materials are included for compounding with the elastomer.

The invention is applicable to the preparation of synthetic elastomers by polymerization in aqueous emulsion or dispersion of monomeric materials which produce latices of synthetic polymer and which are subsequently separated from the aqueous medium by coagulation.

The synthetic elastomeric latices which may be coagulated in accordance with the invention may be prepared by processes well known in the art such as, for example, prior art processes wherein a polymerizable monomeric material or a mixture of polymerizable materials is emulsified in an aqueous medium by means of an emulsifying agent such as a soap or other suitable surface active agent, and the polymerization made to take place at a controlled temperature in the presence of a suitable catalyst and/or other regulating materials. The primary emulsifier preferably should be unstable at low pH and may be a long chain fatty acid soap such as sodium or potassium oleate or stearate, the rosin soaps, or mixtures thereof. The polymerization is generally "short-stopped" at a suitable stage before complete conversion, such as at about 60% conversion, and the unreacted monomer or monomers removed by conventional flashing and/or stripping. As is well understood in the art, it is also advantageous in the preparation of certain synthetic rubber latices, such as SBR latices, to carry out the polymerization at a low temperature such as about 41° F. However, the polymerization may take place at a high temperature such as about 122° F. when preparing SBR latices by a prior art "hot rubber" process.

Examples of polymerizable materials for use in preparing the synthetic rubber latices are the various 1,3-butadienes such as 1,3-butadiene, methyl-2-butadiene-1,3-piperylene, and 2,3-dimethyl-butadiene-1,3. If desired, the polymerizable material may be a mixture of a 1,3-butadiene, such as 1,3-butadiene, with another polymerizable compound which is capable of forming rubbery copolymers with 1,3-butadienes. For example, such polymerizable mixtures may contain up to 50% (or higher in some instances) of a compound which contains a $CH_2=C=$ group wherein at least one of the disconnected valences is attached to an electroactive group, i.e., a group which substantially increases the electric dissymmetry or polar character of the molecule. Examples of compounds containing the aforementioned group and copolymerizable with the 1,3-butadienes are the aryl olefins, such as styrene and vinyl naphthalene; the alpha methylene carboxylic acids, and their esters, nitriles and amides, such as acrylic acid, methyl acrylate, methyl methacrylate, acrylonitrile, methacrylonitrile and methacrylamide; isobutylene; methyl vinyl ether; and methyl vinyl ketone. The foregoing polymerizable substances or mixtures are examples of materials that may be processed in accord with the present invention which may be referred to in the specificaton and claims as latices of homopolymers of conjugated diolefins and copolymers of conjugated diolefins and ethylenically unsaturated monomers. In addition, natural rubber latex and polychloroprene latex may be used.

Currently, the coagulated elastomer, with or without added carbon black, extender oils, fillers, antioxidants and the like additives, is washed, dried and then baled for shipment to distant stations where the elastomeric material is compounded with various ingredients, vulcanizing agents and the like for use in the manufacture or rubber-like articles, such as tires, belts, tubing, hose and the like. The elastomeric materials, as received, is processed for compounding with the various added ingredients by hot working on rolls, in a bambury or other processing equipment.

For this purpose, it is necessary to break up the bale to weigh out the desired amount of elastomeric material and to reduce the bale into smaller segments for feeding to the processing equipment. This involves the expenditure of considerable time and effort as well as the expenditure of an excessive amount of energy for achieving the desired mixture and distribution of ingredients compounded with the elastomeric material. Even then, uniform distribution of the ingredients is difficult to achieve, with the result that such non-uniformities in material distribution are carried over into the articles that are finally produced.

Thus, it is an object of this invention to produce and to provide a method for producing elastomeric materials of the type described in a dry free flowing particulate form, in which the particles can be packaged for shipment to distant stations without loss of their free flowing characteristics thereby to enable accurate weighing out of the elastomeric material for further compounding at the station of use, which enables greater efficiencies to be introduced into the compounding operation by reason of the ability to automate the processing steps with the free flowing elastomer, in which the effort and energy utilized in compounding can be greatly reduced by reason of the ability to incorporate the carbon black, fillers, extender oils and other additives in the desired amounts directly into the free flowing particles of elastomeric material whereby greater accuracy is achieved in the formulation of the compounded elastomer and better distribution is achieved with less work, in which a more uniform dispersion of fillers, carbon black, extender oils, vulcanizing agents, antioxidants and the like can be achieved in the compounded elastomer with considerable improvement not only in the uniformity of the product but in the physical properties of the elastomeric product as well.

These and other objects and advantages of this invention will hereinafter appear and for purposes of illustration, but not of limitation, an embodiment of the invention is illustrated in the accompanying drawing in which:

The FIGURE is a schematic flow diagram showing the various steps employed in the practice of this invention.

A typical polymerization process for the preparation of elastomers that can be fabricated in accordance with the practice of this invention will hereinafter be made with reference to the preparation of the latex of a butadiene-styrene copolymer. It will be understood that others of the described coagulatable elastomeric materials, with or without carbon black, extender oils, fillers, antioxidants, and other additives may be processed in the same way to produce a latex from which free flowing dry particles may be produced in accordance with the practice of this invention.

A typical recipe in parts by weight for preparing a butadiene-styrene synthetic rubber latex by a "cold rubber" process is illustrated by the following:

Table 1

| | |
|---|---|
| Butadiene | 100–50 |
| Styrene | 0–50 |
| Primary emulsifier[1] | 5.0 |
| Electrolyte[2] | 0.2–1.5 |
| Secondary emulsifier[3] | 0–0.12 |
| Ethylenediamine tetraacetic acid tetrasodium salt[4] (in soap solution) | 0–0.10 |
| Sodium hydrosulfite | 0–0.10 |
| Diisopropyldibenzene hydroperoxide or paramethane hydroperoxide (catalyst) | 0.03–0.30 |
| Tertiarydodecylmercaptan | 0–0.3 |
| Ferrous sulfate heptahydrate | 0.02–0.04 |
| Versene 100 tetrasodium salt of ethylene diamine tetraacetic acid to complex ferrous sulfate | 0.03–0.06 |
| Shortstop[5] | 0.05–0.20 |

[1]The primary emulsifier may be a long chain fatty acid soap such as sodium or potassium oleate or stearate, the rosin soaps, or mixtures thereof.
[2]The following electrolytes or mixtures may be used: Potassium chloride, sodium chloride, trisodium phosphate, tripotassium phosphate, potassium pyrophosphate, potassium sulfate, sodium sulfate, sodium borate and lithium chloride. The preferred electrolyte is 0.3 part by weight of potassium chloride.
[3]Tamol N, Daxad 11, Nycol (polymerized sodium salts of alkyl naphthalene sulfonic acid).
[4]Sold as Versene 100, a product of Dow Chemical Company; Sequestrene 30A, a product of Alrose Chemical Company; Nullapon BF-13, a product of Antara Chemicals.
[5]A 50/50 mixture of sodium dimethyl dithio carbamate and sodium polysulfide.

The butadiene-styrene (GRS) latex was prepared by the conventional cold rubber process, using the above recipe with the polymerization being carried out at a temperature within the range of 40°–60° F. Use may be made of the hot rubber process wherein the reaction temperature is maintained within the range of 60°–150° F. The polymerization reaction is short-stopped at about 55–60% conversion and the unreacted monomer was removed by conventional flashing and stripped to produuce a latex.

For a detailed description of the emulsion polymerization of other elastomers, included within the practice of this invention, including the preparation of a latex of butadiene-acrylonitrile in the manufacture of nitrile rubbers, reference can be made to the text entitled *Synthetic Rubbers* by G. S. Whitby, published in 1954 by John Wiley & Sons, New York, New York.

In general, the butadiene-styrene copolymers comprise the copolymerization of 9–28 parts by weight styrene with 91–72 parts by weight butadiene; the butadiene-acrylonitrile elastomers are formed by copolymerization of 15–50 parts by weight acrylonitrile with 50–85 parts by weight butadiene, while butadiene elastomers are homopolymers of butadiene.

The latex, whether it be a butadiene-styrene copolymer, a butadiene-acrylonitrile copolymer, or any of the other coagulatable polymeric or copolymeric materials formed by emulsion or dispersion polymerization and described as capable of being processed in accordance with the practice of this invention, is fed at a predetermined rate from a latex storage tank 10 along with aqueous carbon black slurry, antioxidant and processing oil (when used) to a head tank 12.

The following is representative of a typical formulation for the preparation of a black masterbatch with GRS elastomer or, as in the following example, with butadiene-acrylonitrile copolymer, in which the ingredients are given in parts by weight.

Copolymer solids in latex: 100
Carbon black: 50
Antioxidant: 1.25

In the above example, use is made of a butadiene-acrylonitrile latex having a bound acrylonitrile content within the range of 20–45% and a Mooney viscosity within the range of 30–100 ML 1+4 (100° C.).

To achieve good dispersion of the carbon black, it is desirable to form the carbon black to a particular size where 95% passes through a 325 Tylor mesh screen. For this purpose, the carbon black is passed through a jet grinder 14 operating under high steam pressure injected through line 16 and quenched in a water tower prior to mixing with the latex in the head tank 12. Use is generally made of an aqueous slurry containing 3 to 12% by weight carbon black.

If the polymer is too soft (low Mooney), it will be too sticky to fluid dry in accordance with the practice of this invention to form dry particulate. Such low Mooney, sticky polymers can be hardened by increasing the amount of carbon black and/or decrease the amount of extender oil since the latter tends to soften the elastomer.

It is undesirable to make use of an amount of carbon black in excess of 200 parts by weight carbon black per 100 parts by weight elastomer. Otherwise, excessive dusting occurs in the subsequent preparation of the free flowing particulate. It is preferred to maintain the level of carbon black to less than 100 parts by weight per 100 parts by weight elastomer, with the preferred range being 25 to 100 parts by weight carbon black per 100 parts by weight of elastomer in the preparation of black masterbatch.

When processing oils are included, higher levels of carbon black can be incorporated. The amount of processing oil will depend somewhat on the type of elastomer that is being processed. For example, the preferred range of processing oil will be from 5–40 parts by weight per 100 parts by weight of butadiene-acrylonitrile rubber; 5–100 parts by weight per 100 parts by weight butadiene-styrene rubber; 5–100 parts by weight per 100 parts by weight polybutadiene rubber, and 5–40 parts by weight per 100 parts by weight polyvinylchloride. The processing oil (when used) can be added in the desired amounts at the same time as the additions are made of carbon black to the head tank 12.

Antioxidants are employed to prevent degradation of the elastomer during subsequent treatment to produce the dry particulate. Antioxidants that may be used are represented by polyphenols, hindered phenols, polyamide, and paraphenylene diamines, as illustrated by the compounds marketed by Vanderbilt Chemical Company under the trade name Argerite DPPD (a diphenyl-para-phenylene diamine); Argerite Stalite (a mixture of mono and dioctyl diphenylene diamine); Argerite Superlite (an alkalated polyphenol); Goodyear Chemical Wingstay 200 (a mixed diaryl-para-phenylene diamine), Wingstay S (a styrenated phenol); Ethyl Corporation Ethyl 712 (a 4,4'bis(2,6-tert-butyl phenol); and E. I. Dupont Neozone (a phenol beta naphthylamine). The amount of antioxidant may range from 0.5–3.5 parts per 100 parts by weight of the elastomer and preferably about 1.5 parts per 100 parts by weight of elastomer.

A mixer is provided in the head tank for vigorous agitation of the latex, carbon black slurry and antioxidant. From the head tank 12, the mixture is introduced with a coagulation aid into a coagulation tank 20.

Use can be made of any suitable coagulant well known to the skilled in the art such as cationic coagulants, alum, calcium chloride, or other acid salts, but it is preferred to make use of an aqueous solution of a mineral acid. While any mineral acid can be used, such as sulfuric acid, hydrochloric acid, phosphoric acid and the like, it is preferred to make use of a dilute solution of sulfuric acid. Other coagulants, including organic acids, such as acetic acid or carbonic acid, can be used.

It is desirable to achieve substantially complete coagulation (at least 95%) while the materials are present in the coagulation tank. This can be achieved at a pH within the range of 1.0 to 6.0 and preferably at a pH within the range of 2.5 to 3.0 with the materials maintained at a temperature within the range of 60°–180° F. and preferably at temperatures within the range of 115°–130° F.

When coagulation is carried out at low pH, or with acid salts, such as alum or calcium chloride, beneficial results are achieved by the addition of a flocculant, such as a cationic flocculant in the form of a primary amines or a mixed amines in which a primary amine is a major constituent, such as marketed by Nalco Chemical under the designation of Nalco 108.

Upon coagulation, the polymer forms into particles. For the preparation of dry free flowing elastomeric particles, in accordance with the practice of this invention, it is desirable to effect coagulation in a manner to produce particles having the size of 0.5–5 mm and preferably 2–3 mm in cross section.

The particle size can be controlled during coagulation by a number of variables including pH, temperature, agitation, residence time, and level cationic flocculant, when used. Low pH tends to yield particles of a smaller size while high pH gives particles of a larger size. The particle size can be varied inversely with temperature in that particles of smaller size are produced at high temperature while particles of larger size are produced at lower temperatures. Similarly, the particle size can be varied by the amount of agitation with samller particles at high agitation and larger particles with low agitation, while the size of the particles is somewhat proportional to residence time with the particle size increasing with increase of residence time. Thus, the size of the particle produced during coagulation can be determined by adjustment of the above variables.

It will be understood that some variation in particle size will occur whereby particle size below and above the size range desired will be formed but, by applying the above variables, the amount thereof can be held to a minimum to enable such out-of-size particles to be removed in subsequent screening steps.

From the economical standpoint, it is undesirable to hold the emulsion in the coagulation tank until coagulation has been completed. To complete coagulation, the emulsion is transferred from the coagulation tank 20 to a soap conversion tank 22, when about 95% of the coagulation has taken place. The coagulation of the elastomeric material is completed in the soap conversion tank wherein soap remaining in the emulsion is converted to acid and where additions can be made, if needed, of flocculant and acid to complete the coagulation. The supernatent liquid from the soap conversion tank should be clear, indicative of the substantially complete coagulation of the elastomer. In the event that a clear supernatent is not observed from the coagulation tank or from the combination of the coagulation tank and the soap tank, uncoagulated elastomer that remains will tend to plate out onto the surfaces of the particles to cause sticking which will gum up the screens used for particle separation and transfer with the free flowing of dry particles that are formed.

Residual polymerization ingredients, such as emulsifiers, soaps and the like are removed by means of a water spray 24 applied while the particulate formed by coagulation travels over a shaker screen 26. The shaker screen transfers the sprayed particulate to a wash tank 28 provided with an agitator. Use is made of water at neutral pH and preferably heated to an elevated temperature within the range of 130°–195° F. for washing the particulate for more effectie removal of acid and to facilitate dewatering in the subsequent drying operations.

In the illustrated modification, the washed particulate is advanced to a spin dryer 30, or other suitable dewatering device, such as a centrifugal dryer, to reduce the moisture content to below 60% by weight and preferably to within the range of 35–50% by weight. The spin dryer is effective to remove residual water especially when the surface tension is lowered by heating the particulate material during the washing operation. Other dewatering systems can be used but it is desirable to avoid means wherein the particles are impacted or subjected to pressure, otherwise the wet elastomeric particles will be caused to agglomerate.

The dewatered particles are capable of maintaining their separated relation for sizing on shaker or vibratory screens 32. Undersize of less than 0.5 mm in cross section are returned to the coagulation tank as seed on which polymers can be coagulated to form particles of larger dimension. The oversize is removed from the system or else processed through a grinder 34 for particle size reduction and returned to the size screen for separation. In practice, the oversize amounts to less than 1% by weight of the particulate and generally less than 0.5% by weight.

Removal of the remaining moisture in an amount to produce a dry, free flowing particulate, without excessive agglomeration, has heretofore represented the most serious obstacle to achieving the desired results. This has now been accomplished, in accordance with an important concept of this invention, by effecting the removal of moisture by hot air while the particles are maintained in a fluidized state and by cooling the dried particles while still maintaining the fluidized state whereby the particles are reduced in temperature by an amount that avoids an adhesive state that would otherwise cause agglomeration.

For this purpose, use is made of a fluid bed dryer of the type described in U.S. Pat. No. 3,525,162 wherein a housing 40 is subdivided by partitioning walls 42, which extend upwardly for a short distance from the bottom wall 44 to define a plurality of intercommunicating compartments 46. All of the compartments are provided with a distributor in the form of a porous plate 48 or screen which operates to distribute the gases introduced through inlets in the bottom wall of each compartment, with the opening in the distributor plate being dimensioned to prevent the passage of particulate material therethrough while permitting gases to flow upwardly to maintain the particulate material in each compartment in a fluidized state.

In all but the last compartment 50 or compartments, the gas, preferably air, introduced to fluidize the particulate material, is heated to a temperature above 130° F.

and preferably 140°–165° F. while the gas or air introduced into the last compartment or compartments represents cooling air at a temperature below 130° F. and preferably below 120° F. An important feature of the fluid bed dryer, subdivided into compartments, is to enable the introduction of drying gases at temperatures most suitable for the efficient removal of moisture, depending somewhat on the moisture content of the particles within the particular compartment.

In the illustrated modification, use is made of a fluid bed dryer 40 subdivided into five compartments, the first four of which are drying compartments while the last is a cooling compartment operating under the conditions set forth in Table I. It will be understood that more or less compartments may be employed as long as there remains at least one compartment for drying and at least one compartment for cooling the dried particles.

In operation, the dewatered and screened elastomeric particles are carried for introduction into the first compartment by an air blower 52 which maintains the separated relation between particles during transport. As additional particulate material is continuously fed into the first compartment, a corresponding amount of dried particulate flows over the partitioning walls from the first compartment to the second and so on until the flow is from the last of the drying compartments into the cooling compartment 50.

In order to avoid massing or agglomeration, it is desirable to reduce the particles to a temperature below 120° C. and it is desirable to reduce the moisture content to below 3% by weight and preferably to within the range of 0.5–1.5% by weight in the final product, with bone dry particles required for extrusion. In the illustrated modification where use is made of four drying compartments operating at temperatures within the range of 140°–160° F., and a cooling temperature of 120° F., the moisture content of the particulate elastomer is reduced to about 0.9% by weight.

Other dryers wherein the particles are in continuous motion during moisture removal and cooling can be used, such as a tubular dryer, but because of the impact between particles, it would be desirable to make use of lower drying temperatures to avoid massing in such other devices.

The cooled particulate is removed from the cooling compartment at a rate corresponding to the rate of feed and the dried particulate is transported to a mixer 54, which may be in the form of a screw conveyor or ribbon blender for coating the dried elastomeric particles with a partitioning agent.

If, as illustrated in the drawing, the mixer 54 is at a higher level than the outlet from the cooling compartment 50 of the dryer, the dried particles of elastomeric material should be transported by means of a pneumatic conveyor in the form of an air blower 56. Separation of the conveyed particulate for mixing with the partitioning agent is achieved by a cyclone separator 58 which deposits the separated dried elastomeric particles into the ingoing end of the mixer 54.

Separation of the particles for retention of their free flowing characteristics is maintained by the addition of a partitioning agent. The latter can be introduced with the particles in the mixer 54 to coat the surfaces of the particles during the mixing action. Instead, the partitioning agent can be admixed with the particles in advance of the mixer as by the introduction of the partitioning agent with the particles introduced into the dryer or preferably in one of the latter chambers during the drying operation.

Representative of the materials that can be used as partitioning agents are such finely divided substances as talc, anhydrous clay, hydrous clay, silica, silicates, diatomaceous earth and the like siliceous materials, calcium carbonates, zinc stearates, carbon black and fatty acid metal soaps and the like particulate lubricants. In the preferred practice of this invention, the partitioning agent is selected of a material which is to be compounded with the rubber in the manufacture of elastomeric products, such as talc, clay, carbon black, soaps or the like. Under such circumstances, the partitioning agents do not represent a foreign material but instead are combined with the rubber in uniform distribution for easy compounding during subsequent processing. The desired separation of particles is maintained when the partitioning agent is present in an amount of at least 1% by weight of the elastomer and it is undesirable, from the standpoint of dusting, to exceed an amount greater than 10% by weight. Best results are secured when the partitioning agent is employed in an amount within the range of 5%±2% by weight of the elastomer.

EXAMPLES 1 & 2

Table I sets forth the data for processing two batches of butadiene-acrylonitrile elastomer starting with the latex containing 20% by weight polymer. The polymer of Examples 1 and 2 were coagulated on a continuous basis, using the described equipment. The carbon black slurry was made by grinding the black with 1.5 lbs. of steam per lb. of carbon black. The black slurry was mixed with the latex containing antioxidant in the tank 12 and coagulated in the coagulation tank 20.

Coagulation particle size was controlled by pH and temperature and enough coagulant was acquired to obtain a serum as clear as possible in the coagulation tank. Complete coagulation was achieved in the soap conversion tank. The particles were washed on the shaker screen 26 and heated in the wash tank 28 to 150° F. Particle dewatering was achieved in the spin dryer without massing. The rubber particles were dried in the first four compartments of the fluid bed dryer 40 and cooled in the last compartment to a temperature of 120° F. Partitioning agent in the amount of 3–7% was added at the screw coveryor 54. The rubber particles from the conveyor then classified by passage over a screen 60 and then bagged. Oversize was ground for size reduction and returned to the screen 60 for reclassification.

TABLE I

| | Particulate Masterbatch | |
|---|---|---|
| Example | Example 1 Parts by Wt. | Example 2 Parts by Wt. |
| A. Chemical Composition | | |
| BD/ACN - 35 Bound ACN 80 HL1 + 4 (100° C.) 20% Total Solids (TS) | 100 | 100 |
| Non Staining - Non Discoloring Antioxidant Emulsion 20% Total Sodids (TS) | 1.5 | 1.5 |
| Carbon Black N-784 | — | 75 |
| Carbon Black N-550 | 50 | — |
| Total | 151.5 | 176.5 |
| B. Process Conditions Example | | |
| 1. Carbon Black Grinder | | |
| Steam per lb of carbon black | 1.5#/1.0# | 1.5#/1.0# |
| 2. Mix Tank | | |

TABLE I-continued

Particulate Masterbatch

| Example | Example 1 Parts by Wt. | Example 2 Parts by Wt. |
|---|---|---|
| Gallons of latex 20 TS/min | 53 | 45.5 |
| Gallons of A.O. 20 TS/min | .78 | .68 |
| Gallons of carbon black slurry 8%/min | 66.2 | 85.3 |
| 3. Coagulation Tank | | |
| H₂SO₄ to maintain pH | 2.5 | 2.8 |
| Cationic to maintain coag. | clear serum | clear serum |
| Temperature | 140° F. | 120° F. |
| 4. Soap Conversion Tank | | |
| pH | 2.5 | 2.8 |
| Temperature | 140° F. | 120° F. |
| 5. Wash Tank | | |
| pH | 7.0 | 7.0 |
| Temperature | 150° F. | 150° F. |
| Preferred | 170–185° F. | 170–185° F. |
| 6. Fluid Bed Dryer | | |
| 1st Compartment Dryer Temp. | | |
| Dryer Temperature | — | 150° F. |
| Crumb Temperature | — | 140° F. |
| Crumb Moisture | — | 36.8% |
| 2nd Compartment | | |
| Dryer Temperature | — | 162° F. |
| Crumb Temperature | — | 140° F. |
| Crumb Moisture | — | 24.7% |
| 3rd Compartment | | |
| Dryer Temperature | — | 160° F. |
| Crumb Temperature | — | 130° F. |
| Crumb Moisture | — | 9.9–9.3% |
| 4th Compartment | | |
| Dryer Temperature | — | 145° F. |
| Crumb Temperature | — | 125° F. |
| Crumb Moisture | — | 1.6–2.1% |
| 5th Compartment as a Cooler | | |
| Dryer Temperature | — | 120° F. |
| Crumb Temperature | — | (120° F.) |
| Crumb Moisture | | (.9–.9%) |
| 7. Addition of partitioning Agent | | |
| Talc % on masterbatch | (3–6%) | (3–6%) |

Table II compares the processing and product of butadiene-acrylonitrile processed to a dry free flowing particle in accordance with the practice of the invention (Example 3) with the same elastomer processed into bales in accordance with the procedures heretofore applied (Example 4).

Table II

| FORMULATION | Example 3 Particles | Example 4 Bale |
|---|---|---|
| Polymer | 175 | 100 |
| N-770 Black | — | 75 |
| Micro Cel E | 20 | 20 |
| DOP | 20 | 20 |
| Stearic Acid | 1 | 1 |
| Zinc Oxide | 5 | 5 |
| MBTS | 1.5 | 1.5 |
| Sulfur | 1.5 | 1.5 |
| Total parts | 224.0 | 224.0 |
| BAMBURY MIX | | |
| Energy Consumption, Kilowatt hours | 0.130 | 0.333 |
| Mixing cycle time (mins.) | 0.6 | 5.2 |
| MILL MIX | | |
| Mixing cycle time (mins.) | 3.0 | 9.5 |
| Compound Mooney, ML 1+4 at 212° F. | 92 | 82 |
| Mooney Scorch (MS at 275° F.) | | |
| Minutes to 5-pt. rise | 17.8 | 22.9 |
| Minimum reading | 35 | 24 |
| PHYSICAL PROPERTIES (20' at 310° F.) | | |
| Tensile, psi | 1900 | 2000 |
| Elongation, % | 400 | 460 |
| 300% Modulus, psi | 1525 | 1350 |
| Hardness, Shore A | 72 | 71 |
| Compression set, (50' cure) 22 hrs., at 212° F., % | 44.6 | 50.0 |

It will be seen that the consumption of energy in the bambury or processing rolls is greatly reduced. The time required for mixing is also greatly reduced without loss in physical properties of products molded thereon. The products produced by the process described and claimed are free flowing particles which are roughly spherical in shape, having a rough surface and porous structure. They range in size from 0.5–5 mm in diameter with the major portion of the particles falling within the range of 2–3 mm in cross section.

While the invention has been described with reference to the inclusion of carbon black as an ingredient admixed with the elastomer in producing particulate of black masterbatch, it should be understood that the preparation of a free flowing particulate, in accordance with the practice of this invention, can be carried out with the elastomeric material from a latex without carbon black, processing oils, fillers and the like or with any mixtures thereof.

It will be understood that changes may be made in the details of construction, arrangement and operation without departing from the spirit of the invention, especially as defined in the following claims.

We claim:

1. In the preparation of free flowing particles of elastomeric polymers formed of monomers which are polymerizable in aqueous medium in the presence of an emulsifying agent to form a latex, the steps of coagulating the latex by control of one or more of the conditions of agitation, pH, temperature, time and flocculant additions to coagulate the formed elastomer into particles, separating the coagulated particles from the aqueous medium, washing the separated coagulated particles, dewatering the separated particles to a moisture content of less than 65%, screening the coagulated particles to subdivide the particles into an undersize of less than 0.5 mm and an oversize of more than 5 mm, and a product within the range of 0.5 to 5 millimeters in cross-section, and then drying and cooling the separated product particles while in a fluidized state in a continuous sequence of stages initially with hot gases for the removal of moisture and then with cooling gases to reduce the dried particles to a temperature below 120° C. and a moisture content below 3% by weight to minimize sticking, and admixing a solid partitioning agent with the dried particles in an amount within the range of 1–10% by weight to coat the surfaces of the dried particles to obstruct agglomeration between the dried particles.

2. The method as claimed in claim 1 in which coagulation is carried out by addition of an acidic medium to the latex to provide for a pH within the range of 1.0 to 6.0.

3. The method as claimed in claim 1 in which the coagulation from the latex is carried out at a temperature within the range of 60°–180° F.

4. The method as claimed in claim 1 which includes the addition of a flocculant to the latex to assist in the coagulation of the polymeric material.

5. The method as claimed in claim 1 which includes the addition of carbon black to the latex prior to coagulation to produce a coagulant containing the carbon black in uniform distribution throughout the coagulated elastomeric particles in the production of a black master batch.

6. The method as claimed in claim 5 in which the carbon black is incorporated in an amount up to 200 parts by weight of carbon black to 100 parts by weight of elastomer.

7. The method as claimed in claim 5 in which the carbon black is incorporated in an amount within the range of 25 to 100 parts by weight per 100 parts by weight of elastomer.

8. The method as claimed in claim 1 which includes the addition of an antioxidant to the latex prior to coagulation for uniform distribution in the coagulated particles of elastomeric material.

9. The method as claimed in claim 8 in which the antioxidant is present in an amount within the range of 0.5 to 3.5 parts by weight per 100 parts by weight of elastomer.

10. The method as claimed in claim 1 which includes the addition of a processing oil to the latex prior to coagulation to produce coagulated elastomeric particles containing the processing oil uniformly distributed therein.

11. The method as claimed in claim 10 in which the processing oil is incorporated in an amount within the range of 5 to 100 parts by weight per 100 parts by weight of elastomer.

12. The method as claimed in claim 1 in which the particles are dewatered in a spin dryer.

13. The method as claimed in claim 1 in which the drying in the fluidized state is carried out in a continuous fluidized bed dryer in which the particles are suspended in hot drying gases followed by cooling gases before removal from the dryer.

14. The method as claimed in claim 13 in which the fluidized bed dryer is subdivided into a number of compartments through which the particles are continuously advanced from an entrance at one end to an exit at the other with all but the last compartments comprising drying compartments into which hot fluidized gases are introduced while the last compartments are cooling compartments in which the particles are cooled to a temperature below 120° F.

15. The method as claimed in claim 1 in which the coagulated particles, separated from the latex are washed with hot water to remove soluble residue and to heat the particles to elevated temperature prior to drying.

16. The method as claimed in claim 15 in which the wash water is at a temperature within the range of 130°–195° F.

17. The method as claimed in claim 1 in which the partitioning agent is combined with the particles of elastomeric material in an amount within the range of 2-7% by weight.

18. The method as claimed in claim 1 in which the partitioning agent is a component desired subsequently to be compounded with the elastomeric material.

19. The method as claimed in claim 1 which includes the step of recycling the undersize from the screening operation to the coagulation step and grinding the oversize and recycling to the screening step.

20. The method as claimed in claim 1 in which the emulsifying agent comprises a soap and which includes the step of converting the soap remaining in the latex after coagulation to acid in a soap conversion step.

21. The method as claimed in claim 10 which includes the step of adding a flocculant during the soap conversion reaction.

* * * * *